United States Patent
Seel et al.

(10) Patent No.: US 8,298,117 B2
(45) Date of Patent: Oct. 30, 2012

(54) METHOD FOR OPERATING A HYBRID DRIVE SYSTEM HAVING A TORQUE CONVERTER

(75) Inventors: Andreas Seel, Hemmingen (DE); Rene Schenk, Tamm (DE); Oliver Kaefer, Murr (DE); Thorsten Juenemann, Sindelfingen (DE)

(73) Assignee: Robert Bosch GmbH, Stuttgart (DE)

(*) Notice: Subject to any disclaimer, the term of this patent is extended or adjusted under 35 U.S.C. 154(b) by 1021 days.

(21) Appl. No.: 12/300,681

(22) PCT Filed: Oct. 5, 2007

(86) PCT No.: PCT/EP2007/060584
§ 371 (c)(1),
(2), (4) Date: Nov. 13, 2008

(87) PCT Pub. No.: WO2008/043712
PCT Pub. Date: Apr. 17, 2008

(65) Prior Publication Data
US 2009/0124453 A1 May 14, 2009

(30) Foreign Application Priority Data
Oct. 12, 2006 (DE) .......... 10 2006 048 355

(51) Int. Cl.
*B60W 10/02* (2006.01)
*B60W 10/06* (2006.01)
*B60W 10/08* (2006.01)
(52) U.S. Cl. ............ 477/5; 477/167; 477/181; 903/930
(58) Field of Classification Search .............. 477/5, 167; 903/930
See application file for complete search history.

(56) References Cited

U.S. PATENT DOCUMENTS

| 2003/0004032 A1* | 1/2003 | Tamor ............................. 477/5 |
| 2003/0153429 A1* | 8/2003 | Boll ............................... 477/6 |
| 2004/0153231 A1 | 8/2004 | Itoh et al. |
| 2008/0064561 A1* | 3/2008 | Popp et al. ...................... 477/5 |

FOREIGN PATENT DOCUMENTS

| DE | 197 48 423 | 2/1999 |
| DE | 10 2004 002705 | 9/2004 |
| DE | 10 2004 002061 | 8/2005 |
| JP | 2001-349226 | 12/2001 |
| JP | 2007-284057 | 11/2007 |
| JP | 2007-326557 | 12/2007 |
| WO | 2004/026606 | 4/2004 |
| WO | WO 2006/048968 | 11/2006 |

OTHER PUBLICATIONS

International Search Report of Application No. PCT/EP2007/60584, dated Dec. 17, 2007.

* cited by examiner

*Primary Examiner* — Edwin A Young
(74) *Attorney, Agent, or Firm* — Kenyon & Kenyon LLP

(57) ABSTRACT

A method for operating a hybrid drive system, in particular of a motor vehicle, having at least one electric machine and one internal combustion engine, a disconnecting clutch being provided between the electric machine and the internal combustion engine and a torque converter having a turbine wheel being provided between the electric machine and a hybrid drive output, the disconnecting clutch being engaged for starting the internal combustion engine. It is provided that, as a function of the rotational speed of the turbine wheel of the torque converter, a rotational speed is predefined for the electric machine such that no sudden torque change occurs at the hybrid drive output when the internal combustion engine is started.

8 Claims, 1 Drawing Sheet

METHOD FOR OPERATING A HYBRID DRIVE SYSTEM HAVING A TORQUE CONVERTER

FIELD OF THE INVENTION

The present invention relates to a method for operating a hybrid drive system, in particular of a motor vehicle, having at least one electric machine and one internal combustion engine, a disconnecting clutch being provided between the electric machine and the internal combustion engine and a torque converter having a turbine wheel being provided between the electric machine and a hybrid drive output, the disconnecting clutch being engaged for starting the internal combustion engine.

BACKGROUND INFORMATION

The above-described configuration of a hybrid drive system permits a purely electrical operation using the electric machine, the disconnecting clutch being disengaged and thus the internal combustion engine not being mechanically linked to the remaining drive train of the hybrid drive system. In this state, the internal combustion engine may be turned off in order to save fuel. Since it is not mechanically linked to the remaining drive train, it transmits no (negative) drag torque, which would have to be compensated for by the electric machine.

In the event of a higher power requirement and/or when the battery associated with the electric machine is being increasingly discharged, the internal combustion engine must be started. In internal combustion engines having a starter, it is used for starting. In internal combustion engines without a starter, the start of the internal combustion engine is achieved by engaging the disconnecting clutch, the disconnecting clutch being controlled to a defined slip torque. The internal combustion engine is accelerated using this slip torque until it has reached the same rotational speed as the electric machine; the additional torque must be provided by the electric machine so that the drive torque on the hybrid drive output does not change. Since the actual slip torque of the disconnecting clutch cannot be accurately ascertained, it is not possible to activate the electric machine by simply using an appropriate additional torque. In contrast, the rotational speed of the electric machine is easily measurable and also dynamically regulatable, so that the rotational speed is regulated during the start operation.

A method is known from the related art in which the rotational speed of the electric machine is held constant at the beginning of the start operation of the internal combustion engine as a setpoint value for the entire start. The disadvantage here is that, if the motor vehicle accelerates or decelerates at the same time, the resulting slip of the torque converter changes. In the event of a simultaneous gear shift, for example, this may reach the point where the direction of slip of the torque converter changes and thus the torque is reversed, which results in a clearly perceptible jolt.

In addition, a process is known in which the development of the rotational speed is extrapolated from the rotational speed curve prior to the start operation. However, since the route traveled, such as an upward or downward slope, is not known, the result is not reliably predictable.

SUMMARY OF THE INVENTION

It is provided according to the exemplary embodiments and/or exemplary methods of the present invention that, as a function of the rotational speed of the turbine wheel of the torque converter, a rotational speed is predefined for the electric machine such that no sudden torque change occurs at the hybrid drive output when the internal combustion engine is started. The rotational speed of the turbine wheel corresponds to the rotational speed at the output or at the output shaft of the torque converter and is therefore equal to the transmission input speed of a transmission connected downstream from the torque converter. If the rotational speed of the turbine wheel is known, a desired slip may be set in the hydraulic torque converter as a function of a transmitted torque by regulating the rotational speed of the electric machine. By setting the rotational speed of the electric machine as a function of the rotational speed of the turbine wheel, the rotational speed of the electric machine corresponding to the rotational speed of a pump wheel driving the turbine wheel, a sudden torque change may be prevented when starting the internal combustion engine, i.e., a constant torque may be ensured.

The rotational speed of the electric machine is advantageously determined by adding the rotational speed of the turbine wheel to a setpoint slip speed. The slip speed corresponds to the delta value of the rotational speeds of the turbine wheel and of the electric machine. As said previously, the slip speed is proportional to a transmitted torque of the hydraulic torque converter. The rotational speed of the electric machine is determined by adding a setpoint slip speed, which determines the torque to be transmitted, to the rotational speed of the turbine wheel. Since the instantaneous transmission input speed, i.e., the rotational speed of the turbine wheel, is used as the basis for determining the rotational speed of the electric machine, the method is independent of a change in the vehicle's velocity and/or a gear shift during the start operation of the internal combustion engine.

The setpoint slip speed is advantageously determined as a function of the rotational speed of the turbine wheel and a hybrid drive output setpoint torque, so that the torque transmitted by the torque converter may be set.

The setpoint slip speed is advantageously taken from a characteristics map stored, for example, in a control unit of the hybrid drive system. This may be calculated in a way that is known to those skilled in the art.

According to a refinement of the exemplary embodiments and/or exemplary methods of the present invention, the rotational speed of the electric machine is predefined as a function of a driver's input drive torque, so that the slip speed is continuously adapted to the driver's input drive torque, avoiding the feeling that the hybrid drive system is uncoupled from the accelerator pedal during the start operation of the internal combustion engine.

Another specific embodiment of the present invention is characterized in that the setpoint slip torque is limited as a function of an operating mode of the hybrid drive system. Therefore it is advantageous, for example, for an operating mode which makes a comfortable ride possible, if no sudden torque changes occur such as, for example, when the driver removes his foot from the accelerator pedal.

A zero crossing former may be used for limiting the setpoint slip speed. The zero crossing former limits the allowable rate of change in the slip speed as a function of the absolute value of the instantaneous slip speed. Smaller and smaller changes are allowed with decreasing slip speed. It is thus achieved that, in the event of a reversal of the sign of the torque, zero crossing takes place slowly and the drive train of the hybrid drive system is not disadvantageously excited.

According to a refinement of the exemplary embodiments and/or exemplary methods of the present invention, a lockup clutch of the torque converter is disengaged for the start operation. The lockup clutch in the engaged state ensures that a torque applied to the pump wheel is transmitted directly—frictionally—to the turbine wheel, so that no slip is possible between the pump wheel and the turbine wheel. For the start operation of the internal combustion engine, the lockup clutch is disengaged, enabling a slip, so that the method according to the present invention may be used.

In the following, the exemplary embodiments and/or exemplary methods of the present invention is elucidated in greater detail with reference to two figures.

DETAILED DESCRIPTION

Figure 1:
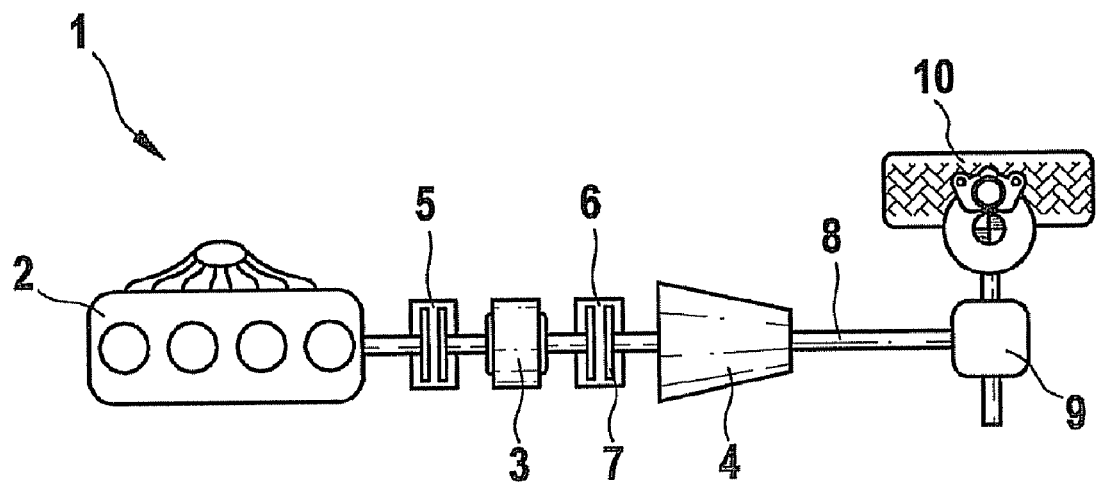
FIG. 1 schematically shows a hybrid drive system having a disconnecting clutch and a hydraulic torque converter, and FIG. 2 schematically shows the method according to the present invention.
Figure 2:
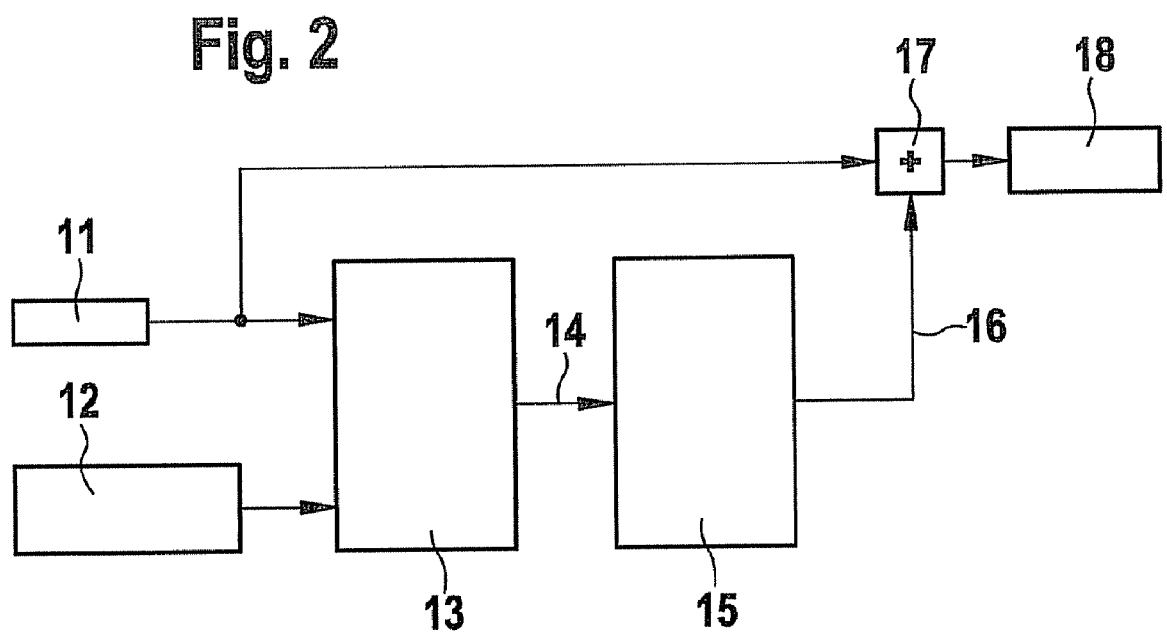

FIG. 1 schematically shows an exemplary embodiment of an advantageous hybrid drive system 1. Hybrid drive system 1 has an internal combustion engine 2, an electric machine 3, and an automatic transmission 4, which are connected in series, a disconnecting clutch 5 being situated between internal combustion engine 2 and electric machine 3, and a torque converter 6, of which only a lockup clutch 7 is depicted here, being situated between electric machine 3 and a hybrid drive output, which here represents the drive of transmission 4. At transmission 4, an output shaft 8 goes to a differential 9, from which the vehicle drive torque is transmitted, for example, to a wheel 10 depicted as an example. In the case of a purely electric drive, disconnecting clutch 5 is disengaged, so that only electric machine 3 is applying a drive torque to drive train 1. In order to start internal combustion engine 2 during the drive operation, disconnecting clutch 5 is engaged using a defined clutch torque. In order to prevent a sudden change in the vehicle drive torque, the rotational speed of the electric machine is advantageously predefined as a function of the rotational speed of the turbine wheel of torque converter 6 as schematically illustrated in FIG. 2. Lockup clutch 7 is advantageously disengaged for the start operation.

FIG. 2 shows, in a block diagram, an exemplary embodiment of the method according to the present invention. Instantaneous rotational speed 11 of the turbine wheel of torque converter 6 from FIG. 1 and a hybrid drive output setpoint torque 12, which may correspond to a driver input drive torque, are supplied to control unit 13, which calculates the necessary slip speed for hybrid drive output setpoint torque 12 as a function of rotational speed 11 of the turbine wheel. The data required therefore are advantageously taken from a characteristics map which is stored in control unit 13. A resulting slip speed 14, which is a function of the drive setpoint torque transmitted by torque converter 6, is limited by a zero crossing former 15, so that in the event of a sign reversal of the transmitted torque, zero crossing takes place slowly and therefore the drive train is not excited. The zero crossing former advantageously limits the allowable rate of change of the slip speed via a function which depends on the absolute value of the instantaneous slip of torque converter 6; the function may also depend on an operating mode such as comfortable ride or sporty ride. As the slip, i.e., the differential speed between pump wheel and turbine wheel of torque converter 6, decreases, smaller and smaller changes are allowed. Setpoint slip speed 16, thus limited, is then added to rotational speed 11 of the turbine wheel by an adder 17, which results in a setpoint rotational speed 18 for electric machine 3.

The slip of torque converter 6 is thus always controlled to match hybrid drive output setpoint torque 12. The control is independent of the change in the velocity of the vehicle and/or a gear shift of transmission 4, since the instantaneous transmission input speed, which corresponds to rotational speed 11 of the turbine wheel, is used as the basis. Furthermore, the slip is advantageously continuously adapted to a driver's input, so that changes at the accelerator pedal during the start operation of internal combustion engine 2 are taken into account, so that the feeling that the drive is uncoupled from the accelerator pedal during the start operation is avoided. The above-described rotational speed regulation of electric machine 3 advantageously works only during the start operation of internal combustion engine 2.

What is claimed is:

1. A method for operating a hybrid drive system of a motor vehicle, comprising:
   providing at least one electric machine;
   providing an internal combustion engine;
   providing a disconnecting clutch between the at least one electric machine and the internal combustion engine;
   providing a torque converter having a turbine wheel between the at least one electric machine and a hybrid drive output;
   engaging the disconnecting clutch for starting the internal combustion engine; and
   predefining, as a function of the rotational speed of the turbine wheel of the torque converter, a rotational speed for the electric machine so that no sudden torque change occurs at the hybrid drive output when the internal combustion engine is started.

2. The method of claim 1, wherein the rotational speed of the electric machine is determined by adding the rotational speed of the turbine wheel to a setpoint slip speed of the torque converter.

3. The method of claim 2, wherein the setpoint slip speed is ascertained as a function of the rotational speed of the turbine wheel and a hybrid drive output setpoint torque.

4. The method of claim 2, wherein the setpoint slip speed is taken from a characteristics map.

5. The method of claim 2, wherein the setpoint slip speed is limited as a function of an operating mode of the hybrid drive system.

6. The method of claim 5, wherein a zero crossing former is used for limiting the setpoint slip speed.

7. The method of claim 1, wherein the rotational speed of the electric machine is predefined as a function of a driver input drive torque.

8. The method of claim 1, wherein a lockup clutch of the torque converter is disengaged for the start operation.

* * * * *